US006985421B2

(12) United States Patent
Tawa et al.

(10) Patent No.: US 6,985,421 B2
(45) Date of Patent: Jan. 10, 2006

(54) OPTICAL DEVICE HAVING A LIGHT EMISSION UNIT EMITTING A LIGHT BEAM REFLECTED BY A LIGHT REFLECTION UNIT TO A SUBSTRATE, AND OPTICAL INFORMATION RECORDING APPARATUS USING THE SAME

(75) Inventors: Fumihiro Tawa, Kawasaki (JP);
Shinya Hasegawa, Kawasaki (JP);
Tetsuo Koezuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1051 days.

(21) Appl. No.: 09/812,031

(22) Filed: Mar. 19, 2001

(65) Prior Publication Data
US 2002/0025162 A1 Feb. 28, 2002

(30) Foreign Application Priority Data
Aug. 24, 2000 (JP) ............................. 2000-254502

(51) Int. Cl.
*G03B 17/48* (2006.01)
(52) U.S. Cl. ................................................ 369/112.01
(58) Field of Classification Search ............. 369/44.12, 369/122, 121, 120, 112.29
See application file for complete search history.

(56) References Cited

U.S. PATENT DOCUMENTS 5,181,193 A * 1/1993 Kume et al. ............. 369/44.23
5,680,385 A * 10/1997 Nagano ................. 369/112.03
6,314,063 B1 * 11/2001 Nemoto .................... 369/44.12
6,496,469 B1 * 12/2002 Uchizaki ..................... 369/122
6,778,486 B1 * 8/2004 Arikawa et al. ....... 369/112.29
2002/0015363 A1 * 2/2002 Nemoto .................... 369/44.12
2002/0039343 A1 * 4/2002 Shindo .................. 369/112.29
2003/0231573 A1 * 12/2003 Matsumoto et al. ... 369/112.29
2004/0022141 A1 * 2/2004 Nakamura et al. ....... 369/44.12

FOREIGN PATENT DOCUMENTS

| JP | 6045708 | 2/1994 |
|---|---|---|
| JP | 10177736 | 6/1998 |
| JP | 10302296 | 11/1998 |
| JP | 10308029 | 11/1998 |

* cited by examiner

*Primary Examiner*—David Hudspeth
*Assistant Examiner*—Adam R. Giesy
(74) *Attorney, Agent, or Firm*—Greer, Burns & Crain, Ltd.

(57) ABSTRACT

In an optical device and optical information recording apparatus of the invention, a light emission unit has an emission layer emitting a light beam along an optical axis. A light reflection unit reflects the light beam, emitted by the light emission unit, to a predetermined direction. A substrate has photodetecting elements disposed thereon, the photodetecting elements detecting a reflected light beam from a storage medium. The emission layer of the light emission unit is slanted to a central axis of the substrate, and the light emission unit and the light reflection unit are disposed on the substrate such that one of a change of a distribution of intensity of the reflected light beam from the light reflection unit and a change of a direction of polarization of the reflected light beam, caused by the slanted emission layer, is corrected.

14 Claims, 12 Drawing Sheets

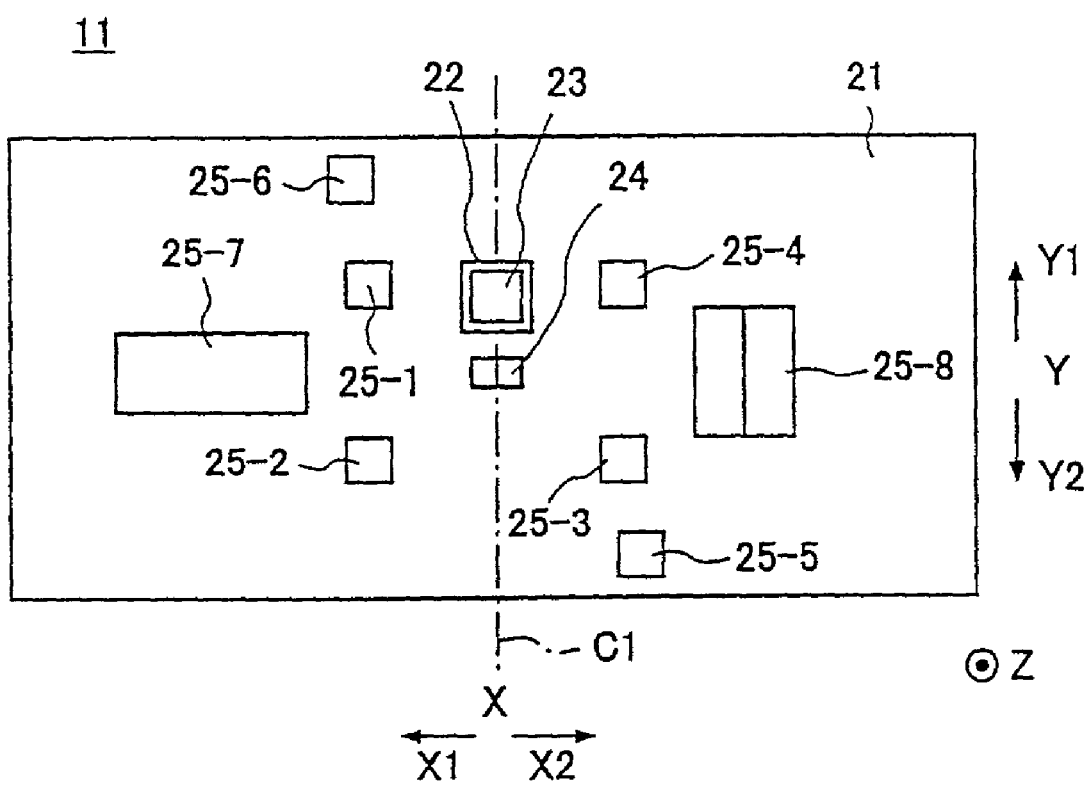

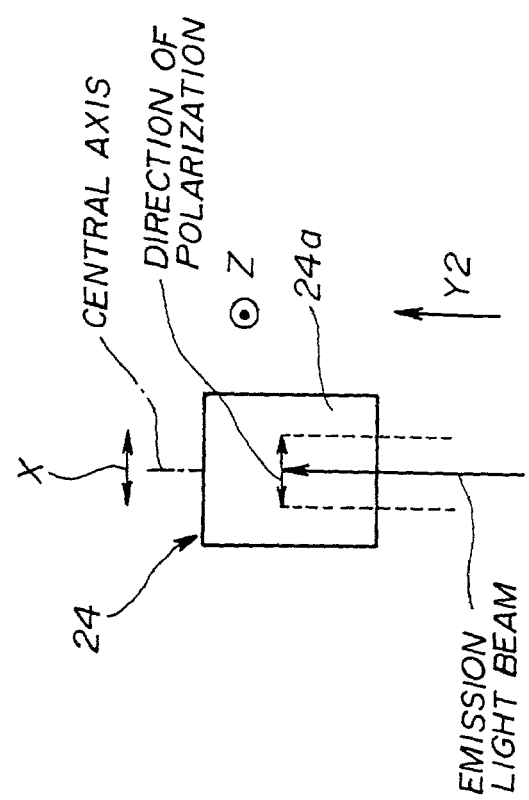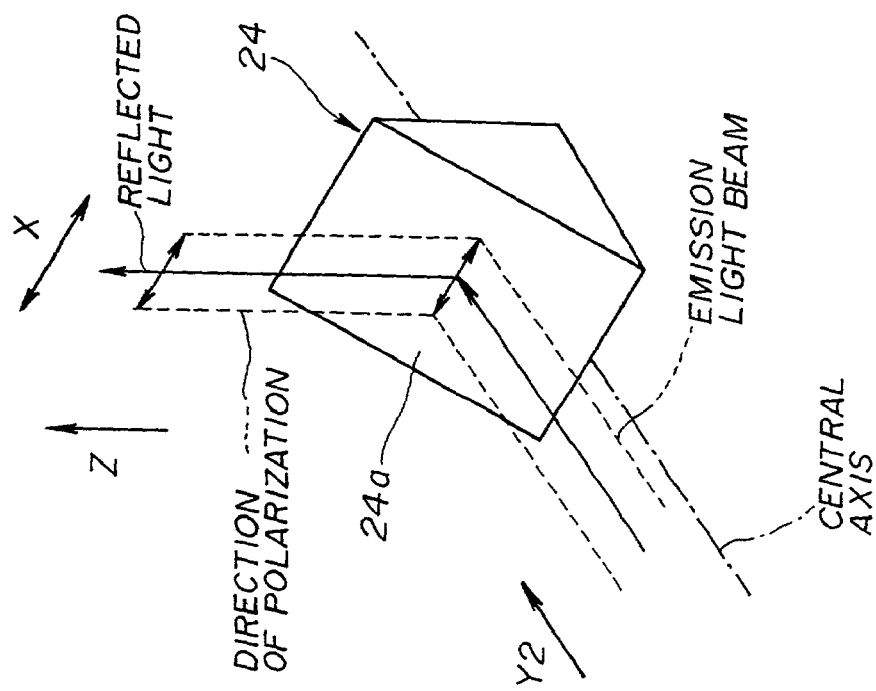

FIG. 6A PRIOR ART
FIG. 6B PRIOR ART
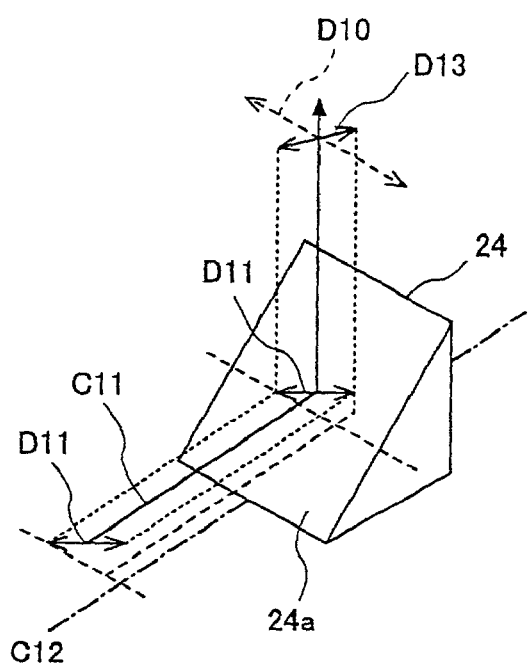
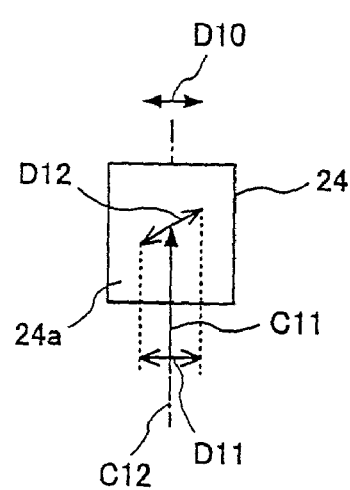

US 6,985,421 B2

OPTICAL DEVICE HAVING A LIGHT EMISSION UNIT EMITTING A LIGHT BEAM REFLECTED BY A LIGHT REFLECTION UNIT TO A SUBSTRATE, AND OPTICAL INFORMATION RECORDING APPARATUS USING THE SAME

BACKGROUND OF THE INVENTION

1. Field of the Invention

The present invention relates to an optical device in which an emission layer of a laser light source is slanted to the direction of the reference surface of the light source substrate. Further, the present invention relates to an optical information recording apparatus using the optical device as an optical head.

2. Description of the Related Art

Recently, optical disk drives, such as MO, CD-ROM or DVD drives, have increasingly used an integrated optical head module as the optical head of each optical disk drive. The integrated optical head module is a single module on which both the laser light source that emits a laser light beam to an optical disk and the light receiving element that receives a reflection beam reflected from the optical disk are provided in common.

The use of an integrated optical head module facilitates the positioning of the optical elements in the optical disk drive with accuracy. The use of an integrated optical head module facilitates the manufacture of optical disk drives and allows the small-sized design of optical disk drives. Further, the recording density of optical disks has been increased to a higher level every year. In such circumstances, there is an increasing demand for an optical information recording apparatus using the integrated optical head module that ensures good quality of a reproduced signal obtained from a reflection light.

FIG. 3 is a diagram of a conventional integrated optical head module.

As shown in FIG. 3, the integrated optical head module 11 generally includes a photodetector substrate 21, a sub-mount 22, a semiconductor laser 23, and a reflector mirror 24. The photodetector substrate 21 is constituted by a semiconductor substrate. A plurality of photodetectors 25-1 through 25-8 are disposed on the surface of the substrate 21. A reflected laser beam from an optical disk is divided into plural laser beams, and such laser beams are respectively supplied to the photodetectors 25-1 through 25-7.

The photodetectors 25-1 through 25-4 detect the reflected laser beams from the disk to output tracking error signals. The photodetectors 25-5 and 25-6 detect the reflected laser beams from the disk to output focusing error signals. The photodetector 25-7 detects a reflected laser beam from the semiconductor laser 23 to output a monitor signal that is used to monitor the intensity of the laser light emitted by the semiconductor laser 23. The photodetector 25-8 detects the reflected laser beam from the disk to output an MO signal that is used to generate a reproduced signal.

The monitor signal output by the photodetector 25-7 is supplied to a laser drive circuit of an optical disk drive (not shown). The laser drive circuit controls the intensity of the laser light, which is emitted by the semiconductor laser 23, based on the monitor signal from the photodetector 25-7. The MO signal output by the photodetector 25-8 is supplied to an MO signal detection circuit of the optical disk drive. The MO signal detection circuit generates a reproduced signal through the decoding of the MO signal from the photodetector 25-8.

The tracking error signal and the focusing error signal, which are output by the photodetectors 25-1 through 25-6, are supplied to a focusing/tracking control circuit of the optical disk drive. The focusing/tracking control circuit drives a focusing actuator (not shown) of the optical head in response to the focusing error signal, so that a focusing control of the deflected laser beam on the disk is carried out. The focusing/tracking control circuit drives a tracking actuator (not shown) of the optical head in response to the tracking error signal, so that a tracking control of the deflected laser beam on the disk is carried out.

In the integrated optical head module 11 of FIG. 3, the sub-mount 22 is disposed onto the substrate 21 at a middle position which is slightly deviated from the center of the substrate 21 in a direction "Y1" indicated in FIG. 3. The semiconductor laser 23 is fixed onto the sub-mount 22. The sub-mount 22 isolates the semiconductor laser 23 from the substrate 21, and provides wiring which connects the semiconductor laser 23 to an external circuit.

In the integrated optical head module 11 of FIG. 3, the semiconductor laser 23 is formed from an Al—Ga—As based semiconductor laser chip, and it is fixed onto the sub-mount 22. The semiconductor laser 23 is connected to the laser drive circuit of the optical disk drive. The semiconductor laser 23 emits a laser light beam in response to a drive signal received from the laser drive circuit. The laser light beam is emitted by the semiconductor laser 23 in a direction Y2 indicated in FIG. 3.

The reflector mirror 24 is disposed on the substrate 21 at a middle position on the central axis of the substrate 21. The reflector mirror 24 includes a sloped reflection surface 24a that faces the semiconductor laser 24 in the direction Y1. The sloped reflection surface 24a is substantially at an angle of 45 degrees to the surface of the substrate 21.

The emitted laser beam from the semiconductor laser 23 is incident to the sloped reflection surface 24a of the mirror 24, and the sloped reflection surface 24a reflects the laser beam in the up direction toward the optical disk. The direction of the reflected laser beam is substantially perpendicular to the surface of the substrate 21. The reflected laser beam from the mirror 24 is divided by optical elements of the optical head into plural laser beams, and most of such laser beams are directed to the optical disk 10 but one of such laser beams is directed to the photodetector 25-7.

FIG. 4A and FIG. 4B are diagrams for explaining a relationship between the reflected light beam and the reflector mirror in the conventional integrated optical head module. FIG. 4A is a perspective view of the mirror 24, and FIG. 4B is a top view of the mirror 24.

The semiconductor laser 23 is provided with an emission 35 layer that is parallel to the surface of the substrate 21. The semiconductor laser 23 is disposed such that the optical axis of the emission light beam from the semiconductor laser 23 is in the direction Y2 that is parallel to a radial direction of the optical disk 10. The reflector mirror 24 is disposed such that the sloped reflection surface 24a is at an angle of 45 degrees to the surface of the substrate 21.

The emitted laser beam from the semiconductor laser 23 has a given direction of polarization with respect to the surface of the substrate 21 as indicated by the arrow X in FIG. 4A and FIG. 4B.

The reflector mirror 24 is disposed such that the reflection surface 24a is substantially parallel to the direction of polarization of the emitted laser beam. Hence, the semiconductor laser 23 and the reflector mirror 24 are disposed on the substrate 21 such that the direction of polarization (or the direction X) of the reflected laser beam from the mirror 24 accords with a tangential direction (or a track direction) of the optical disk 10.

Generally, a laser beam emitted from an emission layer of a semiconductor laser has an elliptic distribution of intensity, the ellipse having a major axis parallel to the lateral direction of the emission layer and a minor axis parallel to the longitudinal direction of the emission layer. It is desired that a laser beam emitted by a semiconductor laser used in a magneto-optical disk drive provide a circular distribution of intensity. For this purpose, Al—Ga—In—As—P based semiconductor lasers have been proposed, which are configured to provide an emitted laser beam having a nearly circular distribution of intensity. A high-output $S^3$ (self-aligned stepped substrate) semiconductor laser has been developed as one of such Al—Ga—In—As—P based semiconductor lasers.

FIG. 5 shows a structure of the Al—Ga—In—As—P based $S^3$ semiconductor laser.

As shown in FIG. 5, in the Al—Ga—In—As—P based $S^3$ semiconductor laser 30, a substrate 31, a clad layer 32, a strain-MQW activation layer 33, a first clad layer 34, a current block layer 35, a second clad layer 36 and a contact layer 37 are provided.

When producing the Al—Ga—In—As—P based $S^3$ semiconductor laser 30, selective etching of the substrate 31 having a primary surface of (100) 6° off (which will be called the reference surface) is first performed. As a result of the etching, the (411)A surface is exposed on the substrate 31 on which a p-type emission layer 38 is formed. The clad layer 32 and the activation layer 33 are formed on the substrate 31 having the (411)A surface. In the activation layer 33, the p-type emission layer 38 is provided on the (411)A surface, and an n-type region 39 is provided on the (100) 6° off reference surface. The current block layer 35 is formed on the (100) 6° off reference surface only, which provide the current blocking function.

As described above, the Al—Ga—In—As—P based $S^3$ semiconductor laser 30 is configured to provide an emitted laser beam having a nearly circular distribution of intensity. However, in the Al—Ga—In—As—P based $S^3$ semiconductor laser 30, the p-type emission layer 38 is formed on the (411)A surface, and the substrate 31 has the (100) 6° off reference surface. For this reason, the emitted laser beam from the emission layer 38 of the semiconductor laser 30 is slanted to the direction of the reference surface of the substrate 31, and the slanted angle ("θ" indicated in FIG. 5) of the emission layer 38 is about 13.5 degrees to the direction of the reference surface of the substrate 31. Therefore, in the conventional integrated optical head module that uses the Al—Ga—In—As—P based $S^3$ semiconductor laser 30 as the laser light source, the direction of polarization of the emitted laser beam from the emission layer 38 is slanted to the direction of the reference surface of the substrate 31 and does not accord with the tangential direction (or the track direction) of the optical disk 10.

FIG. 6A and FIG. 6B are diagrams for explaining laser light emission of the conventional integrated optical head module using the Al—Ga—In—As—P based $S^3$ semiconductor laser 30 as the laser light source. FIG. 6A is a perspective view of the mirror 24, and FIG. 6B is a top view of the mirror 24.

As shown in FIG. 6A and FIG. 6B, even when the conventional integrated optical head module uses the Al—Ga—In—As—P based $S^3$ semiconductor laser as the laser light source 23, the semiconductor laser 23 and the reflector mirror 24 are disposed such that the optical axis (indicated by "C11" in FIG. 6A) of the laser emission of the semiconductor laser 23 is parallel to the central axis (indicated by "C12" in FIG. 6A) of the photodetector substrate 21, and the direction of the reflected laser beam from the sloped reflection surface 24a is substantially perpendicular to the surface of the substrate 21.

However, in the conventional integrated optical head module, the direction of polarization of the emitted laser beam from the semiconductor laser 23 is slanted to the direction of the reference surface of the substrate of the semiconductor laser 23 (the slanted angle is 13.5 degrees). When the semiconductor laser 23 is disposed on the substrate 21 as shown in FIG. 3, the direction of polarization (indicated by "D11" in FIG. 6A) of the emitted laser beam from the semiconductor laser 23 is slanted to the optical axis (indicated by "C11" in FIG. 6A) of the laser emission.

As shown in FIG. 6B, the emitted laser beam from the semiconductor laser 23 is incident to the reflection surface 24a of the mirror 24 with the direction of polarization (indicated by "D12" in FIG. 6B) is slanted. Hence, the direction of polarization (indicated by "D13" in FIG. 6A) of the reflected laser beam from the reflection surface 24a is slanted to or rotated from the desired polarization direction (indicated by "D10" in FIG. 6A).

Therefore, in the conventional integrated optical head module, the direction of polarization of the emitted laser beam from the semiconductor laser 23 is slanted to the direction of the reference surface of the semiconductor laser substrate, and if the semiconductor laser 23 is disposed on the substrate 21 as shown in FIG. 3, the direction of polarization "D13" of the reflected laser beam from the reflection surface 24a of the mirror 24 is rotated from the desired polarization direction "D10". Hence, the distribution of intensity of the reflected laser beam is changed due to the slanted emission layer, and it is difficult to attain good quality of a reproduced signal derived from the reflected laser beam from the optical disk when the semiconductor laser 21 is disposed as shown in FIG. 3.

A conceivable method for eliminating the problem of the conventional integrated optical head module is to perform the design change of the optical elements, including the sub-mount 22, such that the modified optical elements are suited for the requirements of the conventional integrated optical head module using the Al—Ga—In—As—P based $S^3$ semiconductor laser 30. However, the general-purpose optical elements cannot be used for the conventional integrated optical head module, and the manufacturing cost is increased if the above method is used. Further, even if the modified optical elements are used at the sacrifice of the manufacturing cost, it is difficult to immediately attain good quality of a reproduced signal derived from the reflected laser beam from the optical disk.

SUMMARY OF THE INVENTION

It is an object of the present invention to provide an improved integrated optical head device in which the above-described problems are eliminated.

Another object of the present invention is to provide an optical device that provides good quality of a reproduced signal obtained from a reflected light beam from an optical storage medium.

Another object of the present invention is to provide an optical information recording apparatus that ensures good quality of a reproduced signal obtained from a reflected light beam from an optical storage medium.

The above-mentioned objects of the present invention are achieved by an optical device comprising: a light emission unit which has an emission layer emitting a light beam along an optical axis; a light reflection unit which reflects the light beam, emitted by the light emission unit, to a predetermined direction; and a substrate which has photodetecting elements disposed thereon, the photodetecting elements detecting a reflected light beam from a storage medium, wherein the emission layer is slanted to a central axis of the substrate, and the light emission unit and the light reflection unit are disposed on the substrate such that one of a change of a distribution of intensity of the reflected light beam from the light reflection unit and a change of a direction of polarization of the reflected light beam, caused by the slanted emission layer, is corrected.

The above-mentioned objects of the present invention are achieved by an optical information recording apparatus in which a light beam is emitted to a storage medium and information is recorded onto or reproduced from the storage medium, the optical information recording apparatus comprising: a light emission unit which has an emission layer emitting the light beam; a light reflection unit which reflects the light beam, emitted by the light emission unit, to a predetermined direction; and a substrate which has photodetecting elements disposed thereon, the photodetecting elements detecting a reflected light beam from the storage medium, wherein the emission layer is slanted to a central axis of the substrate, and the light emission unit and the light reflection unit are disposed on the substrate such that one of a change of a distribution of intensity of the reflected light beam from the light reflection unit and a change of a direction of polarization of the reflected light beam, caused by the slanted emission layer, is corrected.

In the optical device and optical information recording apparatus of the present invention, the emission layer is slanted to the central axis of the substrate, and the light emission unit and the light reflection unit are disposed on the substrate such that one of a change of a distribution of intensity of the reflected light beam from the light reflection unit and a change of a direction of polarization of the reflected light beam, caused by the slanted emission layer, is corrected. According to the present invention, the reflected light beam from the light reflection unit can have the desired distribution of intensity or the desired direction of polarization. The optical device and optical information recording apparatus of the present invention are effective in providing good quality of a reproduced signal obtained from the reflected light beam from the optical disk.

BRIEF DESCRIPTION OF THE DRAWINGS

Other objects, features and advantages of the present invention will become apparent from the following detailed description when read in conjunction with the accompanying drawings.

FIG. 3 is a diagram of a conventional integrated optical head module.

FIG. 4A and FIG. 4B are diagrams for explaining a relationship between a laser light beam and a mirror in the conventional integrated optical head module.

FIG. 6A and FIG. 6B are diagrams for explaining laser light emission of a conventional integrated optical head module which uses the semiconductor laser of FIG. 5.

DETAILED DESCRIPTION OF PREFERRED EMBODIMENTS

Figure 1:
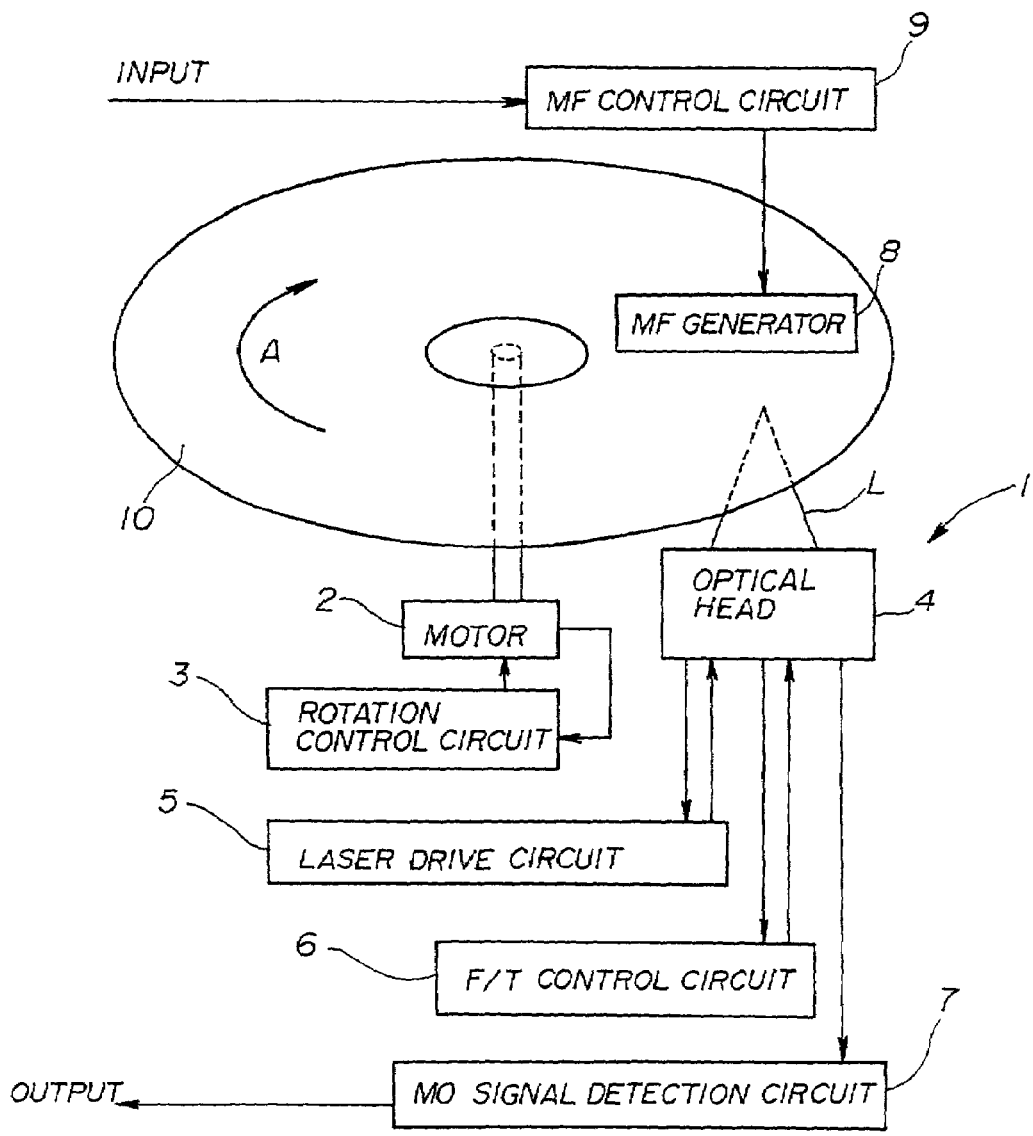
FIG. 1 is a diagram for explaining a configuration of a magneto-optical disk drive.
Figure 2:
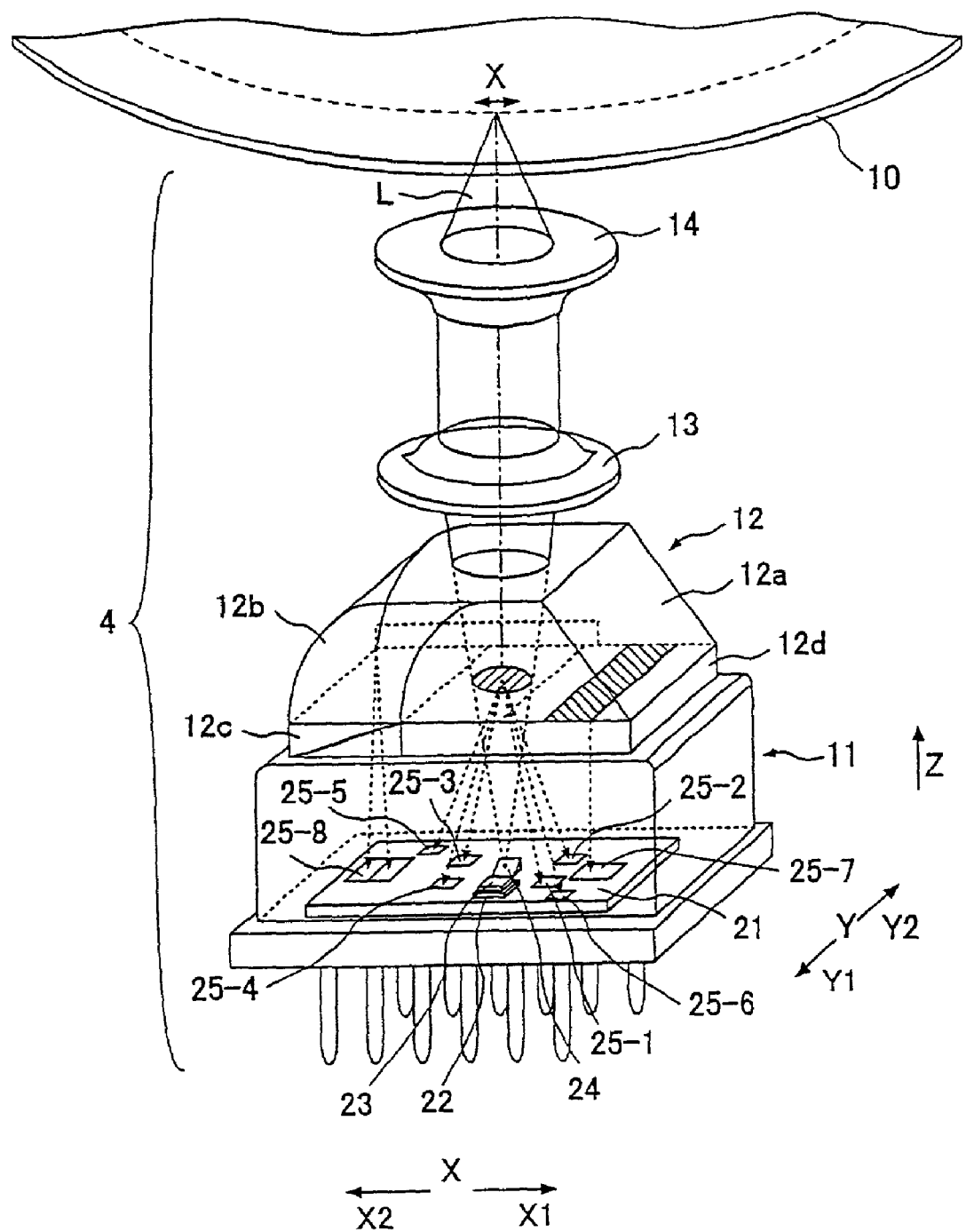
FIG. 2 is a diagram of an optical head in which an integrated optical head module is provided.

Before describing preferred embodiments of the present invention, a description will be provided of an optical information recording apparatus with reference to FIG. 1 and FIG. 2, in order to facilitate understanding of the concepts of the present invention.

FIG. 1 is a schematic diagram of a magneto-optical (MO) disk drive. The MO disk drive 1, shown in FIG. 1, is provided as an optical information recording apparatus in which the optical device of the present invention is embodied.

As shown in FIG. 1, the disk drive 1 generally includes a spindle motor 2, a rotation control circuit 3, an optical head 4, a laser drive circuit 5, a focusing/tracking (F/T) control circuit 6, an MO signal detection circuit 7, a magnetic field (MF) generator circuit 8, and a magnetic field (MF) control circuit 9. A magneto-optical (MO) disk 10 (which will be called the disk) is inserted into the MO disk drive 1.

In the disk drive 1 of FIG. 1, the spindle motor 2 rotates the disk in a rotating direction indicated by the arrow "A" in FIG. 1. The rotation control circuit 3 controls the rotating speed of the spindle motor 2. The optical head 4 includes a laser light source that emits a light beam "L" onto the disk, and detects the intensity of a reflection beam reflected from the disk. The laser drive circuit 5 controls the intensity of the light beam "L" emitted by the light source of the optical head 4.

In the disk drive of FIG. 1, the focusing/tracking (F/T) control circuit 6 controls a focusing actuator and a tracking actuator (both not shown in FIG. 1) of the optical head 4, so that the focusing and tracking control of the light beam "L" emitted from the optical head 4 onto the disk 10. The MO signal detection circuit 7 detects an MO signal based on the signal detected by the optical head 4.

Further, in the disk drive 1 of FIG. 1, the magnetic field (MF) generator circuit 8 produces a magnetic field that is applied to the disk. The magnetic field (MF) control circuit 9 controls the MF generator circuit 8 so that the magnetic field, produced by the MF generator unit 8, is in accordance with a recording signal which is input to the MF control circuit 9.

In a conventional disk drive, the optical head includes the light emitting element, the optical elements (such as the lenses or the prism), and the photodetecting elements, which are separately provided in the conventional disk drive.

Various optical elements are needed to form the optical head of the conventional disk drive, and it is difficult to create a small-size design for the conventional disk drive. The accuracy of assembling of the optical elements to the optical head is liable to become worse.

To eliminate the problems, an integrated optical head module in which the light emitting element, the optical elements and the photodetecting elements are integrated has been developed for use in a small-size optical disk drive.

FIG. 2 shows a structure of an optical head in the disk drive in which the optical device of the present invention, including the integrated optical head module, is embodied.

As shown in FIG. 2, the optical head 4 generally includes an integrated optical head module 11, complex optical elements 12, a collimator lens 13, and an objective lens 14. The integrated optical head module 11 emits a light beam L to the magneto-optical disk 10, and generates an electrical signal in response to a reflected light beam from the disk 10.

The optical elements 12 include a beam splitter 12a, a beam splitter 12b, a beam splitter 12c, and a combined hologram 12d. The optical elements 12 direct the emitted light beam L from the integrated optical head module 11 to the disk 10. The optical elements 12 guide the reflected light beam from the disk 10 to a plurality of photodetectors on the integrated optical head module 11.

As described earlier, in the conventional integrated optical head module, the direction of polarization of the emitted laser beam from the semiconductor laser is slanted to the direction of the reference surface of the semiconductor laser substrate, and if the semiconductor laser is disposed on the photodetector substrate as shown in FIG. 3, the direction of polarization "D13" of the reflected laser beam from the reflection surface 24a of the mirror 24 is rotated from the desired polarization direction "D10" as shown in FIG. 6A. Hence, the distribution of intensity of the reflected light beam is changed due to the slanted emission layer, and it is difficult to attain good quality of a reproduced signal derived from the reflected laser beam from the optical disk when the semiconductor laser is disposed as shown in FIG. 3.

The optical device and optical information recording apparatus of the present invention are configured such that a change of the distribution of intensity of a reflected light beam from a reflector mirror or a change of the direction of polarization of the reflected light beam, caused by the slanted emission layer of the light source, is corrected.

A description will now be provided of preferred embodiments of the present invention with reference to the accompanying drawings.

Figure 7:
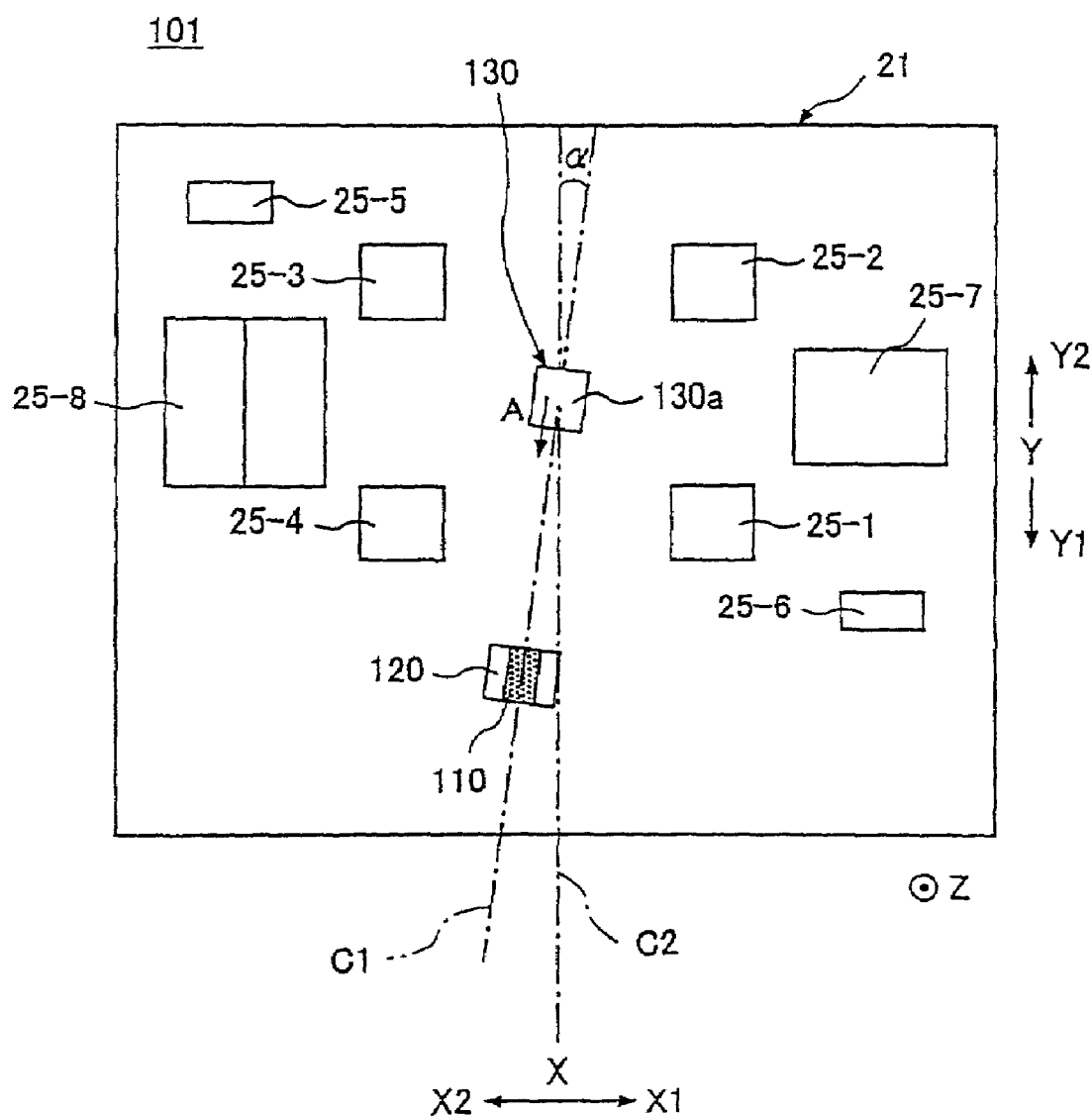
FIG. 7 is a diagram of a first preferred embodiment of the integrated optical head module of the invention.

FIG. 7 is a diagram of a first preferred embodiment of the integrated optical head module of the present invention. The integrated optical head module 101 of the present embodiment is provided within the optical head 4 of the optical disk drive, shown in FIG. 2, in place of the module 11.

In FIG. 7, the elements that are essentially the same as corresponding elements in FIG. 2 or FIG. 3 are designated by the same reference numerals, and a description thereof will be omitted.

As shown in FIG. 7, in the integrated optical head module 101 of the present embodiment, a semiconductor laser 110, a sub-mount 120 and a reflector mirror 130 are disposed on the substrate 21 in a manner different from that of the corresponding elements 23, 22 and 24 in the conventional integrated optical head module 11 of FIG. 3. Other elements in the present embodiment are essentially the same as corresponding elements in FIG. 2 or FIG. 3.

Figure 5:
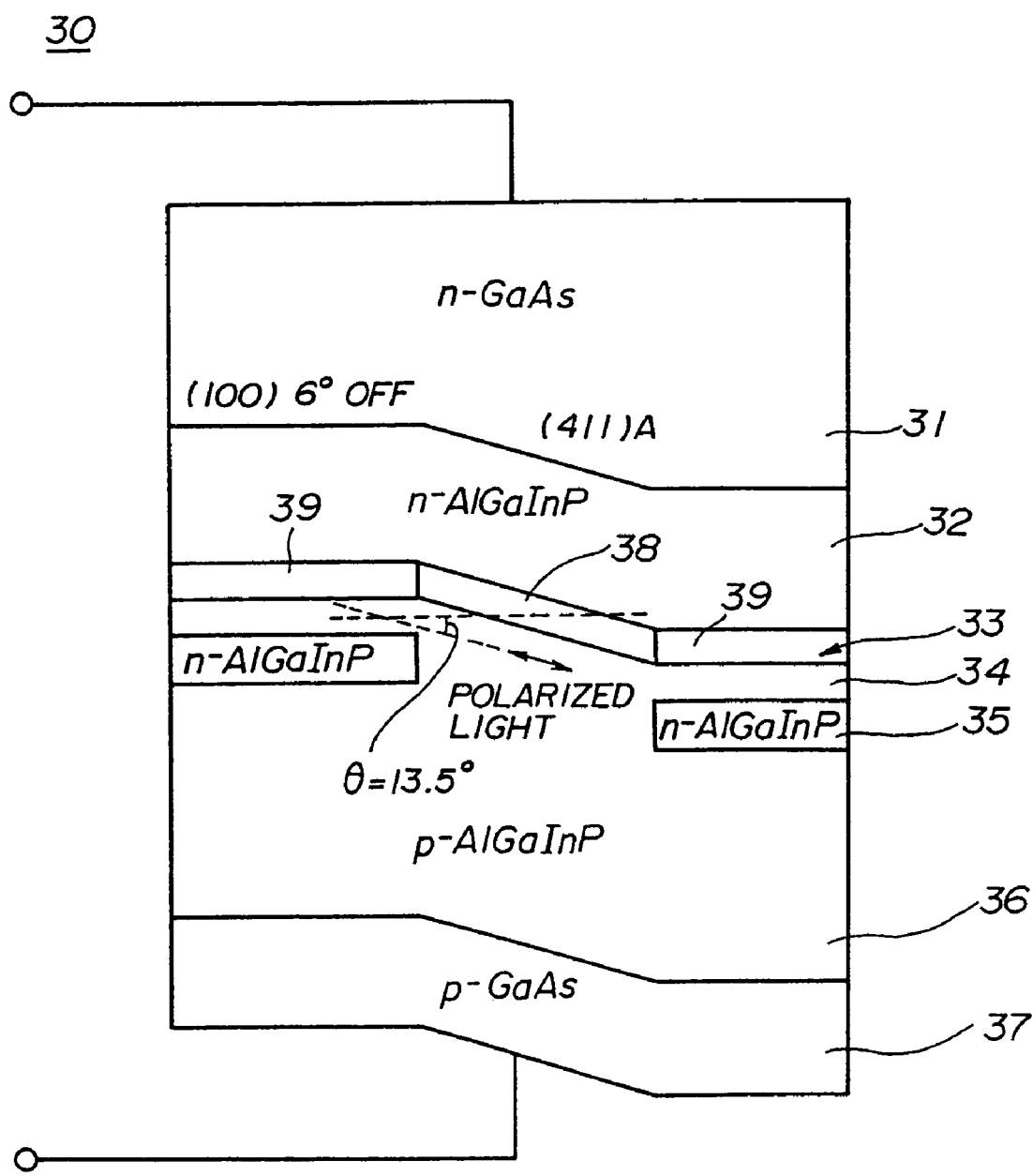
FIG. 5 is a diagram for explaining a structure of a semiconductor laser for use in an integrated optical head module.

In the present embodiment, suppose that the semiconductor laser 110 is constituted by the Al—Ga—In—As—P based $S^3$ semiconductor laser 30 shown in FIG. 5. In the semiconductor laser 120, the emission layer is slanted to the direction of the reference surface of the semiconductor laser substrate, and the slanted angle of the emission layer is about 13.5 degrees.

In the integrated optical head module 101 of FIG. 7, the semiconductor laser 110 is fixed onto the sub-mount 120. The sub-mount 120 is disposed on the photodetector substrate 21 such that an optical axis (indicated by "C1" in FIG. 7) of laser emission of the semiconductor laser 110 is slanted to a central axis (indicated by "C2" in FIG. 7) of the substrate 21. The slanted angle is indicated by "α" in FIG. 7.

In the integrated optical head module 101 of FIG. 7, the semiconductor laser 110 is connected to the laser drive circuit 5 of the optical disk drive 1 shown in FIG. 1. The semiconductor laser 110 emits a laser beam in response to a drive signal received from the laser drive circuit 5. The laser beam is emitted by the semiconductor laser 110 in a slanted direction to the direction Y2 indicated in FIG. 7.

The reflector mirror 130 is disposed on the substrate 21 at a middle position on the central axis C2 of the substrate 21. The reflector mirror 130 includes a sloped reflection surface 130a that faces the semiconductor laser 110 in a slanted direction to the direction Y1 indicated in FIG. 7. The sloped reflection surface 130a has a slope angle (indicated by "β" in FIG. 8A) with respect to the surface of the substrate 21.

The emitted laser beam from the semiconductor laser 110 hits the sloped reflection surface 130a of the mirror 130, and the sloped reflection surface 130a reflects the laser beam in the up direction toward the optical disk 10. The direction of the reflected laser beam is substantially perpendicular to the surface of the substrate 21. The reflected laser beam is focused onto the recording layer of the disk 10. The reflected laser beam from the disk 10 is divided by the optical elements of the optical head 4 into plural laser beams, and such laser beams are directed to the photodetectors 25-1 through 25-6 and 25-8. The reflected laser beam from the mirror 130 is deflected directly to the photodetector 25-7.

The slanted angle α and the slope angle β are predetermined such that the direction of the reflected laser beam from the mirror 130 is substantially perpendicular to the surface of the substrate 21. When the semiconductor laser 30 shown in FIG. 5 is used as the semiconductor laser 110, the slanted angle α is set to about 13.5 degrees, and the slope angle β is set to about 45 degrees.

Figure 8A:
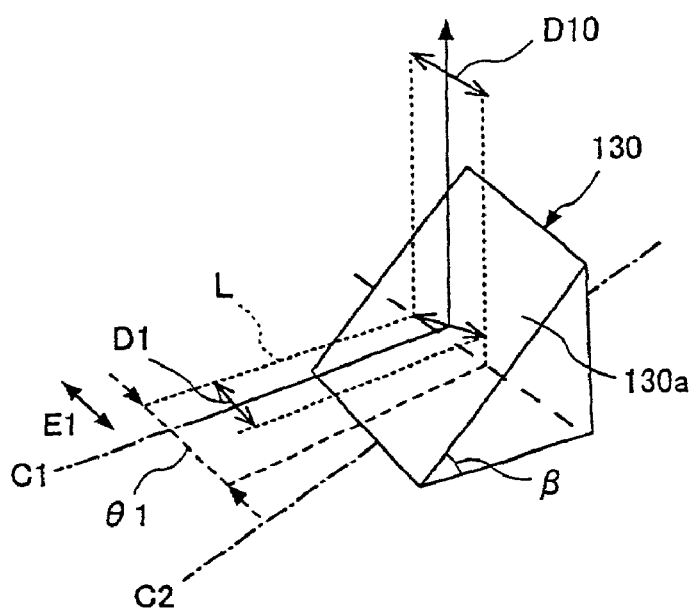
FIG. 8A, FIG. 8B, FIG. 8C and FIG. 8D are diagrams for explaining an optical path of an emitted laser beam from a semiconductor laser which is reflected by a reflector mirror in the integrated optical head module of the present embodiment.
Figure 8B:
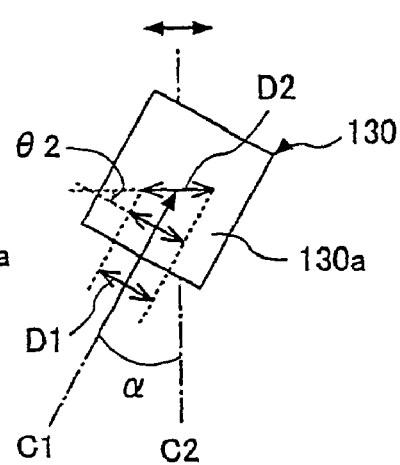
Figure 8C:
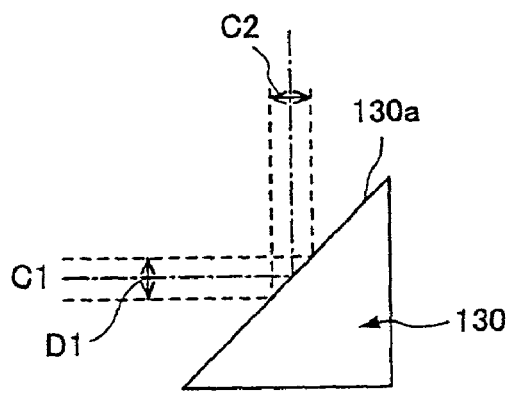
Figure 8D:
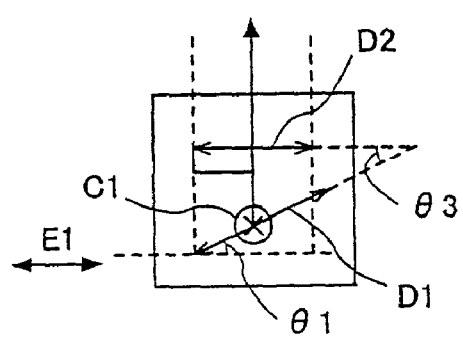

FIG. 8A through FIG. 8D show an optical path of an emitted laser beam from the semiconductor laser 110 which is reflected by the reflector mirror 130 in the integrated optical head module of the present embodiment. FIG. 8A is a perspective view of the mirror 130, FIG. 18B is a top view of the mirror 130, FIG. 8C is a side view of the mirror 130, and FIG. 8D is a front view of the mirror 130.

As shown in FIG. 8A, the emitted laser beam L is incident to the reflection surface 130a of the mirror 130. The direction of polarization (indicated by "D1" in FIG. 8A) of the emitted laser beam L is slanted to a direction (indicated by "E1" in FIG. 8A) that is parallel to the reflection surface 130a as shown in FIG. 8D, and the slanted angle (indicated by "θ1" in FIG. 8D) is about 13.5 degrees. The direction of the reflected laser beam from the reflection surface 130a of the mirror 130 is substantially perpendicular to the surface of the substrate 21 as shown in FIG. 8C.

The direction of polarization D1 of the emitted laser beam L is rotated, when the emitted laser beam L is reflected by the reflection surface 130a of the mirror 130, to the direction of polarization (indicated by "D2" in FIG. 8B) on the plane of the reflection surface 130a, and the rotation angle is indicated by "θ2" in FIG. 8B. As shown in FIG. 8D, the rotation angle θ2 is apparently converted to the rotation angle θ3 when it is viewed from the direction perpendicular to the front of the mirror 130.

As described above, the direction of polarization D1 is rotated to the direction of polarization D2 on the plane of the reflection surface 130a when it is reflected, and the direction of polarization D2 of the reflected laser beam from the reflection surface 130a accords with a desired polarization direction (indicated by "D10" in FIG. 8A). Suppose that the desired polarization direction D10 accords with one of a tangential direction (or a track direction) of the optical disk 10 and a radial direction of the optical disk 10 at right angles to the track direction of the disk 10. The reflected laser beam from the reflection surface 130a is substantially perpendicular to the central axis C2 of the substrate 21, and the direction of the reflected laser beam from the reflection surface 130a is substantially perpendicular to the surface of the substrate 21.

Therefore, in the integrated optical head module 101 of the present embodiment, the emission layer of the semiconductor laser 110 is slanted to the central axis C2 of the substrate 21, and the semiconductor laser 110 and the reflector mirror 130 are disposed on the substrate 21 such that one of a change of the distribution of intensity of the reflected laser beam from the mirror 130 and a change of the direction of polarization of the reflected laser beam, caused by the slanted emission layer, is corrected.

Specifically, in the present embodiment, the sub-mount 120 to which the semiconductor laser 110 is fixed is disposed on the substrate 21 such that the optical axis C1 of laser emission of the semiconductor laser 110 is slanted to the central axis C2 of the substrate 21 (the slanted angle α is about 13.5 degrees in the present embodiment). However, in the integrated optical head module of the present embodiment, it is assumed that the arrangement of the elements (such as the photodetectors, the reflector mirror and the semiconductor laser) on the substrate is the same as that of the corresponding elements in the conventional integrated optical head module shown in FIG. 3.

When the arrangement of the elements on the substrate is different from that of the conventional integrated optical head module of FIG. 3, it is necessary to adjust the positioning of the mirror and the laser by moving them on the substrate such that the direction of polarization D2 of the reflected laser beam from the reflection surface of the mirror accords with the desired polarization direction D10.

The present invention is not limited to the above-described embodiment, and variations and modifications may be made without departing from the scope of the present invention. For example, the reflector mirror 130 is constituted by means of a triangular prism in the above-described embodiment, but it may be integrally formed with the photodetector substrate 120 through anisotropic etching of the substrate 120.

Further, in the above-described embodiment, the semiconductor laser 110 is constituted by the Al—Ga—In—As—P based $S^3$ semiconductor laser 30. Alternatively, the semiconductor laser 110 may be constituted by another type semiconductor laser. A commonly used Al—Ga—As semiconductor laser may be applied to the integrated optical head module of the present invention. According to the present invention, the laser emission characteristics of the semiconductor laser, such as the output power or the wavelength, can be improved, and, if the crystal structure of the semiconductor laser varies, it may be applied to the integrated optical head module of the present invention.

In the above-described embodiment, the optical device of the present invention is applied to the integrated optical head module of a magneto-optical disk drive. However, the application of the optical device of the present invention is not limited to this embodiment. The optical device of the present invention may be applied to the integrated optical head module of CD disk drive, DVD disk drive or other optical disk drives.

In the above-described embodiment, the optical device of the present invention is applied to a single laser beam device. However, the optical device of the present invention may be applied to a multiple laser beam device.

Figure 9:
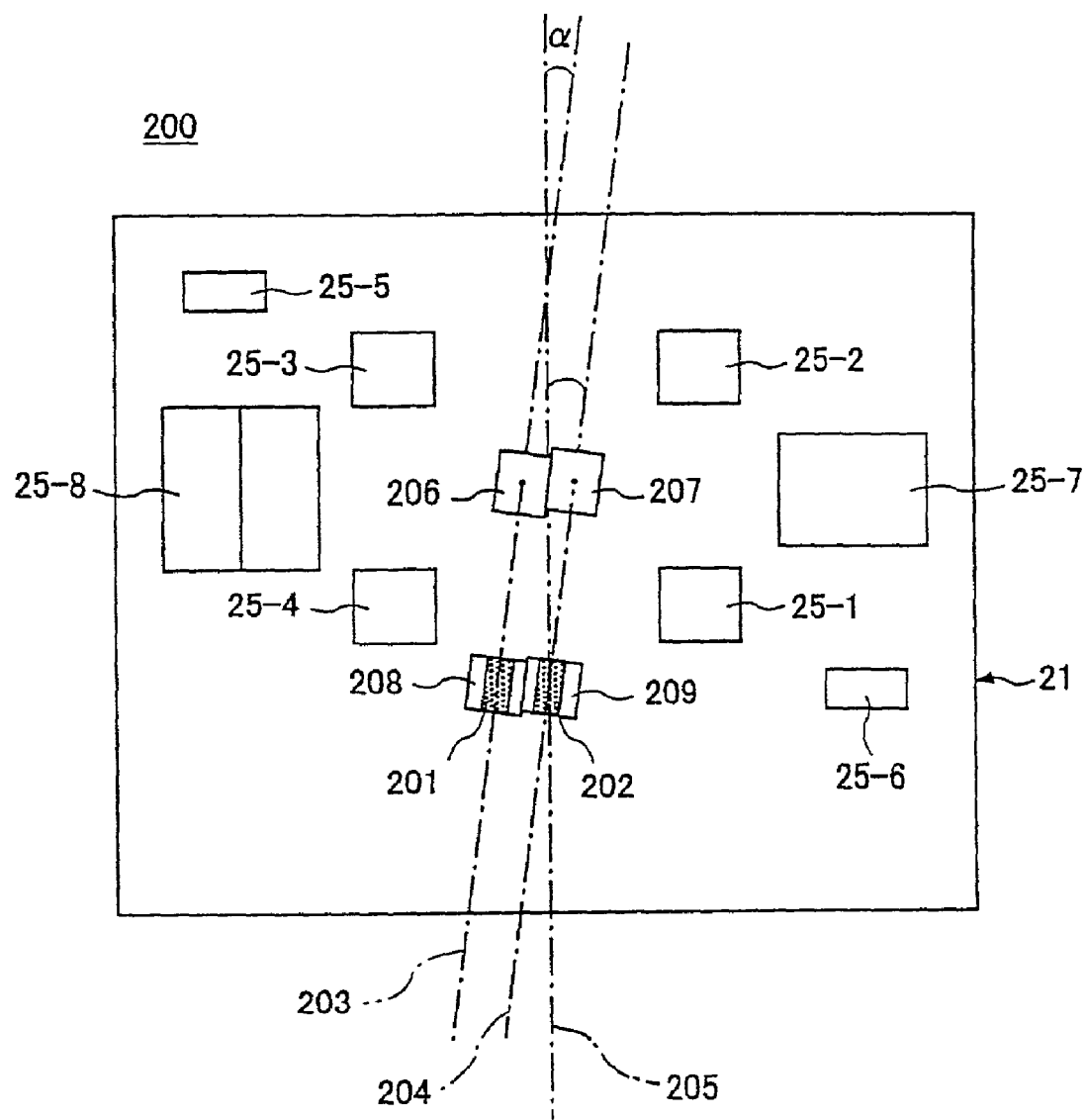
FIG. 9 is a diagram of a second preferred embodiment of the integrated optical head module of the invention.

Next, FIG. 9 shows a second preferred embodiment of the integrated optical head module of the present invention. The integrated optical head module 200 of the present embodiment is provided in the optical head 4 of the optical disk drive, shown in FIG. 2, in place of the module 11.

In FIG. 9, the elements that are essentially the same as corresponding elements in FIG. 7 are designated by the same reference numerals, and a description thereof will be omitted.

As shown in FIG. 9, in the integrated optical head module 200 of the present embodiment, two semiconductor lasers 201 and 202, two sub-mounts 208 and 209, and two reflector mirrors 206 and 207 are disposed in parallel on the substrate 21 in a manner similar to that of the first preferred embodiment shown in FIG. 7. Other elements in the present embodiment are essentially the same as corresponding elements in FIG. 7.

In the present embodiment, suppose that each of the semiconductor lasers 201 and 202 is constituted by the Al—Ga—In—As—P based $S^3$ semiconductor laser 30 shown in FIG. 5. In each of the semiconductor lasers 201 and 202, the emission layer is slanted to the direction of the reference surface of the semiconductor laser substrate.

In the integrated optical head module 200 of FIG. 9, the semiconductor laser 201 is fixed onto the sub-mount 208. The sub-mount 208 is disposed on the substrate 21 such that an optical axis 203 of laser emission of the semiconductor laser 201 is slanted to a central axis 205 of the substrate 21. The slanted angle is indicated by "α" in FIG. 9. Similarly, the semiconductor laser 202 is fixed onto the sub-mount 209. The sub-mount 209 is disposed on the substrate 21 such that an optical axis 204 of laser emission of the semiconductor laser 202 is slanted to the central axis 205 of the substrate 21. The slanted angle is indicated by "α", and the optical axis 204 is parallel to the optical axis 203. Each of the positional relationship between the laser 201 and the mirror 206 and the positional relationship between the laser 202 and the mirror 207 is the same as the positional relationship between the laser 110 and the mirror 130 in the previous embodiment of FIG. 7.

In the integrated optical head module 200 of FIG. 9, the semiconductor lasers 201 and 202 have different wavelengths of the emitted laser light. Alternatively, the semiconductor lasers 201 and 202 may have different directions of polarization of the emitted laser light. One of the semiconductor lasers 201 and 202 is selected by switching, and only the selected one of lasers 201 and 202 is turned ON to emit one of the laser light beams of the two different types (different wavelengths or different polarization directions).

In the integrated optical head module 200 of FIG. 9, the distance between the sub-mount (to which the semiconductor laser is fixed) and the reflector mirror along the optical axis may be set to a distance according to the wavelength of the emission laser light of the semiconductor laser. Alternatively, the distance between the sub-mount and the mirror along the optical axis may be set to such a distance that the aberrations of the optical elements are suitably corrected. Alternatively, the distance between the sub-mount and the mirror along the optical axis may be set to such a distance that the efficiency of use of the emission light is optimized.

In the integrated optical head module 200 of the present embodiment, the emission layer of each of the semiconductor lasers 201 and 202 is slanted to the central axis 205 of the substrate 21, and the semiconductor lasers and the reflector mirrors of the two pairs are disposed on the substrate 21 such that one of a change of the distribution of intensity of the reflected laser beam from each mirror and a change of the direction of polarization of the reflected laser beam, caused by the slanted emission layer, is corrected.

When the integrated optical head module 200 of the present embodiment is applied to the optical head of an optical disk drive, the optical head is capable of recording information onto or reproducing information from each of two optical disks of different types.

In the above-described embodiment, the two semiconductor lasers and the two reflector mirrors are disposed on the substrate 21 such that the optical axis of laser emission of one of the two semiconductor lasers is parallel to the optical axis of laser emission of the other semiconductor laser. Alternatively, the two semiconductor lasers and the two reflector mirrors may be disposed on the substrate 21 such that the optical axes of laser emission of the two semiconductor lasers are symmetric with respect to the central axis 205 of the substrate 21.

Figure 10:
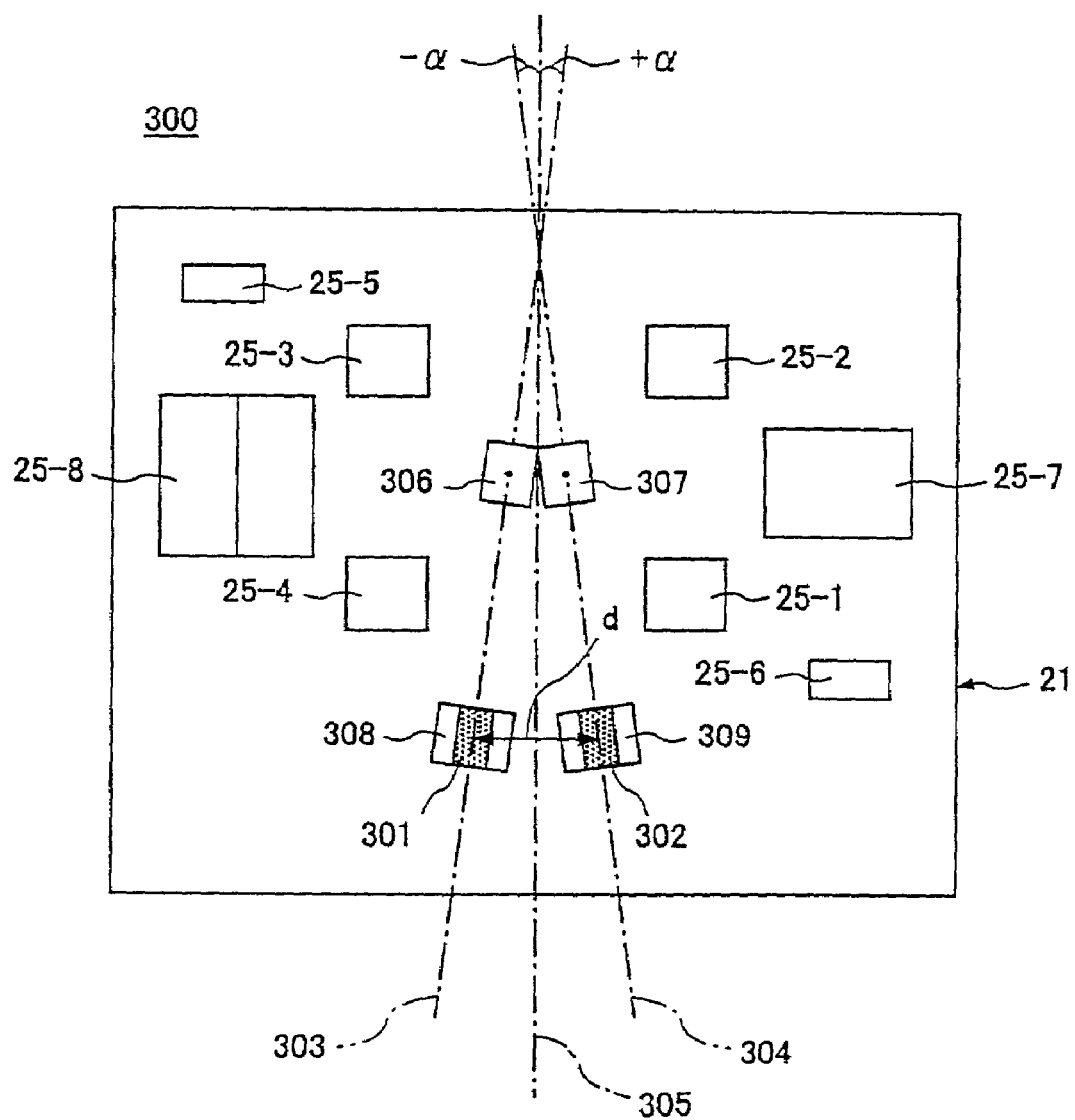
FIG. 10 is a diagram of a third preferred embodiment of the integrated optical head module of the invention.

FIG. 10 shows a third preferred embodiment of the integrated optical head module of the present invention. The integrated optical head module 300 of the present embodiment is provided in the optical head 4 of the optical disk drive, shown in FIG. 2, in place of the module 11.

In FIG. 10, the elements that are essentially the same as corresponding elements in FIG. 7 are designated by the same reference numerals, and a description thereof will be omitted.

As shown in FIG. 10, in the integrated optical head module 300 of the present embodiment, two semiconductor lasers 301 and 302, two sub-mounts 308 and 309, and two reflector mirrors 306 and 307 are symmetrically disposed on the substrate 21 in a manner similar to that of the first preferred embodiment shown in FIG. 7. Other elements in the present embodiment are essentially the same as corresponding elements in FIG. 7.

In the present embodiment, suppose that each of the semiconductor lasers 301 and 302 is constituted by the Al—Ga—In—As—P based $S^3$ semiconductor laser 30 shown in FIG. 5. In each of the semiconductor lasers 301 and 302, the emission layer is slanted to the direction of the reference surface of the semiconductor laser substrate. The slanted angles of the emission layers of the two lasers are opposite to each other.

In the integrated optical head module 300 of FIG. 10, the semiconductor laser 301 is fixed onto the sub-mount 308. The sub-mount 308 is disposed on the substrate 21 such that an optical axis 303 of laser emission of the semiconductor laser 301 is slanted to a central axis 305 of the substrate 21. The slanted angle is indicated by "+α" in FIG. 10.

Similarly, the semiconductor laser 302 is fixed onto the sub-mount 309. The sub-mount 309 is disposed on the substrate 21 such that an optical axis 304 of laser emission of the semiconductor laser 302 is slanted to the central axis 305 of the substrate 21. The slanted angle is indicated by "−α" in FIG. 10. The optical axis 303 and the optical axis 304 are symmetric with respect to the central axis 305.

The positional relationship between the laser 301 and the mirror 306 is the same as the positional relationship between the laser 110 and the mirror 130 in the previous embodiment of FIG. 7. The positional relationship between the laser 302 and the mirror 307 and the positional relationship between the laser 301 and the mirror 306 are symmetric with respect to the central axis 305 of the substrate 21.

Figure 11:
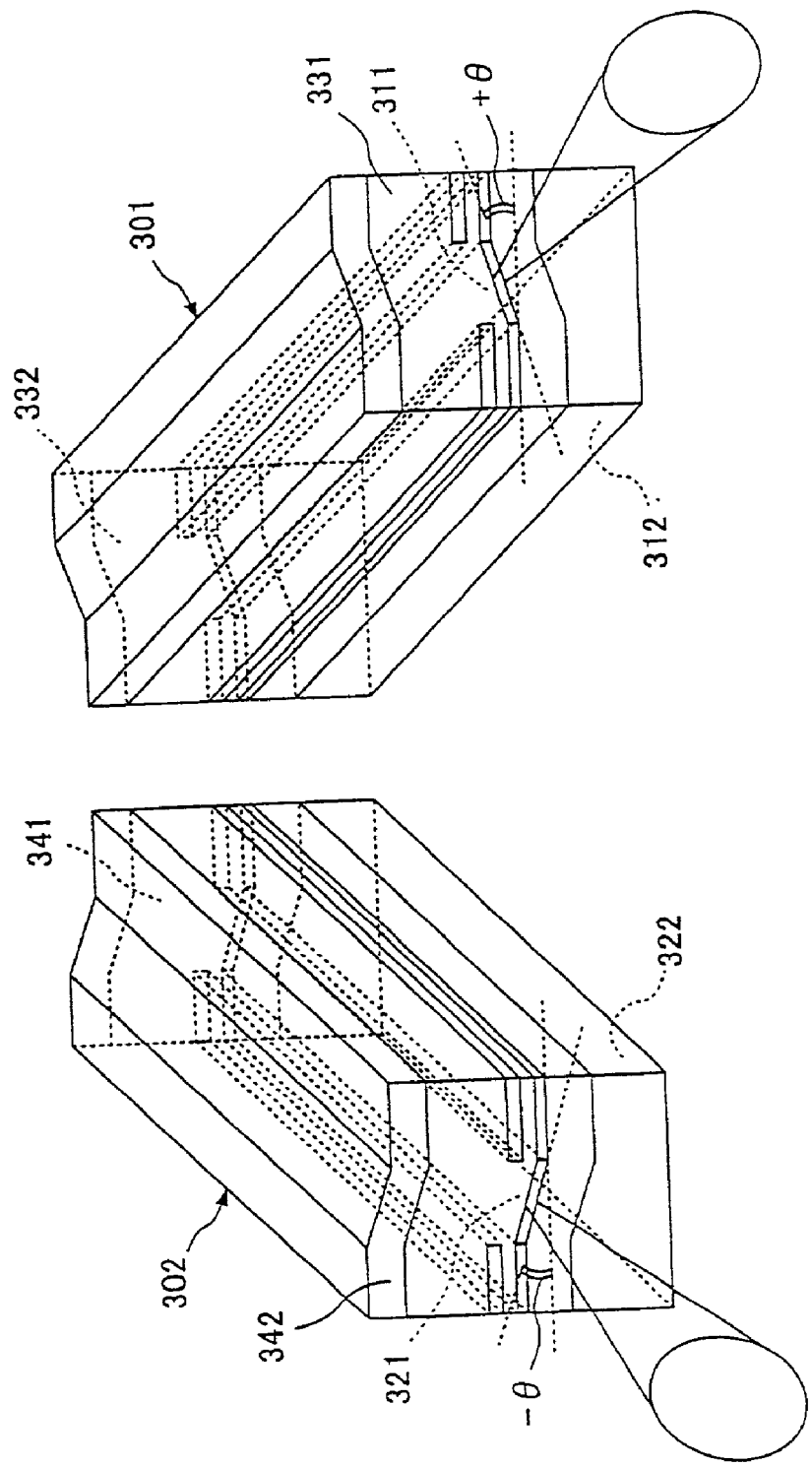
FIG. 11 is a diagram for explaining a structure of semiconductor lasers in the integrated optical head module of the present embodiment.

FIG. 11 shows a structure of the semiconductor lasers 301 and 302 in the integrated optical head module of the present embodiment.

As shown in FIG. 11, in the semiconductor laser 301, an emission layer 3 11 is slanted to a direction of a reference surface 312, and the slanted angle is indicated by "+θ" in FIG. 11. For example, the slanted angle is +13.5 degrees to the direction of the reference surface 312. In the semiconductor laser 302, an emission layer 321 is slanted to a direction of a reference surface 322, and the slanted angle is indicated by "−θ" in FIG. 11. For example, the slanted angle is −13.5 degrees to the direction of the reference surface 322. The semiconductor lasers 301 and 302 are configured such that they are symmetric with respect to the central axis 305 of the substrate 21.

The semiconductor lasers 301 and 302 can be formed together from a semiconductor laser chip having the same structure as that shown in FIG. 11. When producing the semiconductor lasers 301 and 302, cutting of the chip having such structure into pieces is first performed. To form the semiconductor laser 301, a low-reflectance layer is formed on a first end surface 331 of the semiconductor laser 301, and a high-reflectance layer is formed on a second end surface 332. To form the semiconductor laser 302, a high-reflectance layer is formed on a first end surface 341 of the semiconductor laser 302, and a low-reflectance layer is formed on a second end surface 342. In this manner, the semiconductor lasers 301 and 302 are formed such that they are symmetric with respect to the central axis 305 of the substrate 21. The emitted laser beams emitted from the semiconductor lasers 301 and 302 have the directions of polarization that are symmetric with respect to the central axis 305 of the substrate 21.

In the integrated optical head module 300 of the present embodiment, the distance (indicated by "d" in FIG. 10) between the semiconductor lasers 301 and 302 may be set to a large distance that is adequate to effectively dissipate heat produced at the semiconductor lasers 301 and 302 during operation.

In the integrated optical head module 300 of the present embodiment, the emission layer of each of the semiconductor lasers 301 and 302 is slanted to the central axis 305 of the substrate 21, and the semiconductor lasers and the reflector mirrors of the two pairs are disposed on the substrate 21 such that one of a change of the distribution of intensity of the reflected laser beam from each mirror and a change of the direction of polarization of the reflected laser beam, caused by the slanted emission layer, is corrected.

When the integrated optical head module 300 of the present embodiment is applied to the optical head of an optical disk drive, the optical head is capable of recording information onto or reproducing information from each of two optical disks of different types.

In the above-described embodiment, the semiconductor lasers 301 and 302 and the mirrors 306 and 307 are configured such that they are symmetric with respect to the central axis 305 of the substrate 21. Alternatively, the semiconductor lasers and the mirrors of the two pairs may be configured such that they are symmetric with respect to a central point of the substrate 21. In such alternative embodiment, the semiconductor laser and mirror of one of the two pairs is aligned with the semiconductor laser and mirror of the other pair along the optical axis, and the semiconductor lasers and the mirrors of the two pairs are symmetric with respect to the central point of the substrate 21.

Further, in the integrated optical head 300 of the present embodiment, the semiconductor lasers 301 and 302 can be easily formed by cutting of a semiconductor laser chip having the same structure.

Figure 12:
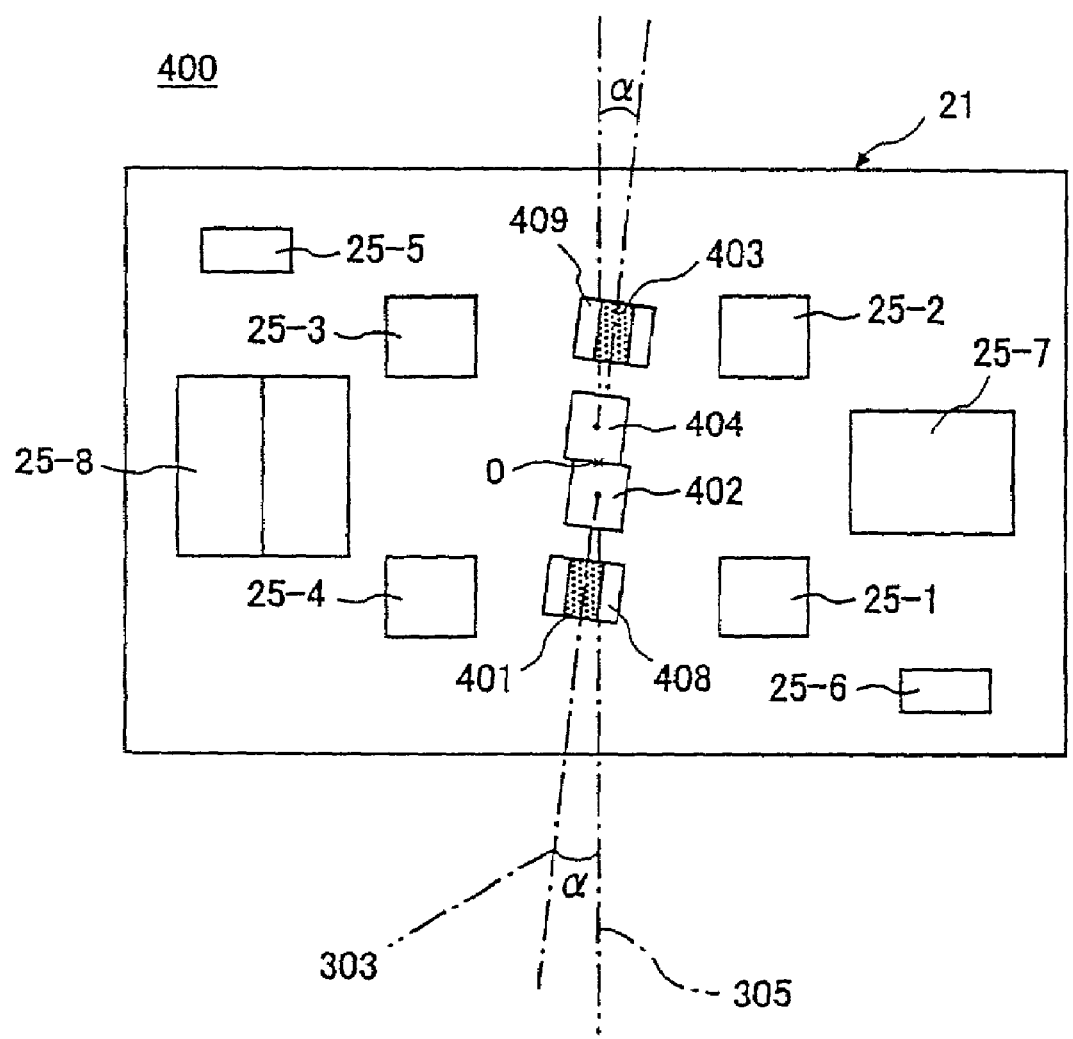
FIG. 12 is a diagram of a fourth preferred embodiment of the integrated optical head module of the invention.

FIG. 12 shows a fourth preferred embodiment of the integrated optical head module of the present invention. The integrated optical head module 400 of the present embodiment is provided in the optical head 4 of the optical disk drive, shown in FIG. 2, in place of the module 11.

In FIG. 12, the elements that are essentially the same as corresponding elements in FIG. 10 are designated by the same reference numerals, and a description thereof will be omitted.

As shown in FIG. 12, in the integrated optical head module 400 of the present embodiment, two semiconductor lasers 401 and 403, two sub-mounts 408 and 409, and two reflector mirrors 402 and 404 are symmetrically disposed on the substrate 21 with respect to a central point "O" of the substrate 21. Other elements in the present embodiment are essentially the same as corresponding elements in FIG. 10.

In the present embodiment, suppose that each of the semiconductor lasers 401 and 403 is constituted by the Al—Ga—In—As—P based $S^3$ semiconductor laser 30 shown in FIG. 5. In each of the semiconductor lasers 401 and 403, the emission layer is slanted to the direction of the reference surface of the semiconductor laser substrate. The slanted angles of the emission layers of the two lasers are the same.

In the integrated optical head module 400 of FIG. 12, the semiconductor laser 401 is fixed onto the sub-mount 408. The sub-mount 408 is disposed on the substrate 21 such that the optical axis 303 of laser emission of the semiconductor laser 401 is slanted to the central axis 305 of the substrate 21. The slanted angle is indicated by "α" in FIG. 12.

Similarly, the semiconductor laser 403 is fixed onto the sub-mount 409. The sub-mount 409 is disposed on the substrate 21 such that the optical axis of laser emission of the semiconductor laser 403 is identical to the optical axis 303 of the semiconductor laser 401, and it is slanted to the central axis 305 of the substrate 21. The slanted angle is indicated by "α" in FIG. 12.

Both the positional relationship between the laser 401 and the mirror 402 and the positional relationship between the laser 402 and the mirror 404 are the same as the positional relationship between the laser 110 and the mirror 130 in the previous embodiment of FIG. 7.

In the integrated optical head module 400 of the present embodiment, the distance between the semiconductor lasers 401 and 403 along the optical axis may be set to a large distance that is adequate to effectively dissipate heat produced at the semiconductor lasers 401 and 403 during operation.

In the above-described embodiments of FIG. 9 through FIG. 12, the two pairs of the semiconductor laser and the reflector mirror are disposed on the substrate 21. Alternatively, three or more pairs of the semiconductor laser and the reflector mirror may be disposed on the substrate 21.

In the above-described embodiments, the semiconductor laser is constituted by the Al—Ga—In—As—P based $S^3$ semiconductor laser 30. Alternatively, the semiconductor laser may be constituted by another type semiconductor laser. A commonly used semiconductor laser in which the emission layer is slanted may be applied to the integrated optical head module of the present invention. According to the present invention, the laser emission characteristics of the semiconductor laser, such as the output power or the wavelength, can be improved, and, if the crystal structure of the semiconductor laser varies, it may be applied to the integrated optical head module of the present invention.

In the above-described embodiments, the optical device of the present invention is applied to the integrated optical head module of a magneto-optical disk drive. However, the application of the optical device of the present invention is not limited to this embodiment. The optical device of the present invention may be applied to the integrated optical head module of CD disk drive, DVD disk drive or other optical disk drives.

In the above-described embodiments, the pattern of the photodetectors on the substrate 21 is essentially the same as that of the conventional device of FIG. 3. However, the present invention is not limited to these embodiments. Various variations and modifications of the pattern of the photodetectors on the substrate 21 may be made without departing from the scope of the present invention, in order to suit them to the optical system and the optical storage medium.

The optical device of the present invention involves integrated optical head modules, optical processing devices, optical information storage devices, and so on.

Further, the present invention is based on Japanese priority application No. 2000-254502, filed on Aug. 24, 2000, the entire contents of which are hereby incorporated by reference.

What is claimed is:

1. An optical device comprising:
    a light emission unit having an emission layer emitting a light beam along an optical axis;
    a light reflection unit reflecting the light beam, emitted by the light emission unit, to a predetermined direction; and
    a substrate having photodetecting elements disposed thereon, the photodetecting elements detecting a reflected light beam from a storage medium,
    wherein the emission layer of the light emission unit is slanted to a central axis of the substrate, and the light emission unit and the light reflection unit are disposed on the substrate such that one of a change of a distribution of intensity of the reflected light beam from the light reflection unit and a change of a direction of polarization of the reflected light beam, caused by the slanted emission layer, is corrected.

2. The optical device according to claim 1, wherein the reflected light beam from the light reflection unit has one of a first corrected direction of polarization that is perpendicular to a tangential direction of the storage medium and a second corrected direction of polarization that is parallel to the tangential direction of the storage medium.

3. The optical device according to claim 1, wherein a plurality of pairs of the light emission unit and the light reflection unit are disposed on the substrate.

4. The optical device according to claim 3, wherein the light emission unit of at least one of the plurality of pairs has the optical axis of the emitted light beam which is different from the optical axes of the emitted light beams from the light emission units of the other pairs.

5. The optical device according to claim 3, wherein the light emission unit of at least one of the plurality of pairs has a direction of the slanted emission layer which is different from a direction of the slanted emission layers of the light emission units of the other pairs.

6. The optical device according to claim 3, wherein the reflected light beams from the light reflection units of at least two of the plurality of pairs have respective corrected directions of polarization which are perpendicular to each other.

7. The optical device according to claim 3, wherein the light emission units of at least two of the plurality of pairs are provided to have different wavelengths of emission light.

8. An optical information recording apparatus in which a light beam is emitted to a storage medium and information is recorded onto or reproduced from the storage medium, comprising:
   a light emission unit having an emission layer emitting the light beam;
   a light reflection unit reflecting the light beam, emitted by the light emission unit, to a predetermined direction; and
   a substrate having photodetecting elements disposed thereon, the photodetecting elements detecting a reflected light beam from the storage medium,
   wherein the emission layer of the light emission unit is slanted to a central axis of the substrate, and the light emission unit and the light reflection unit are disposed on the substrate such that one of a change of a distribution of intensity of the reflected light beam from the light reflection unit and a change of a direction of polarization of the reflected light beam, caused by the slanted emission layer, is corrected.

9. The optical information recording apparatus according to claim 8, wherein the reflected light beam from the light reflection unit has one of a first corrected direction of polarization that is perpendicular to a tangential direction of the storage medium and a second corrected direction of polarization that is parallel to the tangential direction of the storage medium.

10. The optical information recording apparatus according to claim 8, wherein a plurality of pairs of the light emission unit and the light reflection unit are disposed on the substrate.

11. The optical information recording apparatus according to claim 10, wherein the light emission unit of at least one of the plurality of pairs has the optical axis of the emitted light beam which is different from the optical axes of the emitted light beams from the light emission units of the other pairs.

12. The optical information recording apparatus according to claim 10, wherein the light emission unit of at least one of the plurality of pairs has a direction of the slanted emission layer which is different from a direction of the slanted emission layers of the light emission units of the other pairs.

13. The optical information recording apparatus according to claim 10, wherein the reflected light beams from the light reflection units of at least two of the plurality of pairs have respective corrected directions of polarization which are perpendicular to each other.

14. The optical information recording apparatus according to claim 10, wherein the light emission units of at least two of the plurality of pairs are provided to have different wavelengths of emission light.

* * * * *